United States Patent
Vaid et al.

(10) Patent No.: US 8,645,959 B2
(45) Date of Patent: Feb. 4, 2014

(54) METHOD AND APPARATUS FOR COMMUNICATION BETWEEN TWO OR MORE PROCESSING ELEMENTS

(75) Inventors: Kushagra Vaid, San Jose, CA (US); John Crawford, Saratoga, CA (US); Allen Baum, Palo Alto, CA (US)

(73) Assignee: Intel Corporaiton, Santa Clara, CA (US)

( * ) Notice: Subject to any disclaimer, the term of this patent is extended or adjusted under 35 U.S.C. 154(b) by 1688 days.

(21) Appl. No.: 11/095,341

(22) Filed: Mar. 30, 2005

(65) Prior Publication Data
US 2006/0225074 A1  Oct. 5, 2006

(51) Int. Cl.
*G06F 9/46* (2006.01)

(52) U.S. Cl.
USPC .......................................... 718/102; 718/106

(58) Field of Classification Search
USPC ........................................................ 718/106
See application file for complete search history.

(56) References Cited

U.S. PATENT DOCUMENTS

| | | | | |
|---|---|---|---|---|
| 4,969,089 A * | 11/1990 | Jakel | ............................. | 709/245 |
| 5,202,998 A * | 4/1993 | Yanes | ........................... | 710/267 |
| 5,293,620 A * | 3/1994 | Barabash et al. | ............. | 718/102 |
| 5,608,725 A * | 3/1997 | Grube et al. | .................. | 370/338 |
| 6,950,927 B1 * | 9/2005 | Apisdorf et al. | .............. | 712/216 |
| 7,327,762 B2 * | 2/2008 | Lee | ................. | 370/474 |
| 7,480,706 B1 * | 1/2009 | Hooper et al. | ................ | 709/223 |
| 7,533,168 B1 * | 5/2009 | Pabla et al. | .................. | 709/224 |
| 2003/0014472 A1 * | 1/2003 | Ohsawa et al. | ............... | 709/107 |

OTHER PUBLICATIONS

Zhang, L. et al., *Highly Efficient Synchronization Based on Active Memory Operations*, Proceedings of the18th International Parallel and Distributed Processing Symposium (IPDPS'04), Santa Fe, NM, Apr. 26-30, 2004, p. 58a (10 pages).

* cited by examiner

*Primary Examiner* — Camquy Truong
(74) *Attorney, Agent, or Firm* — Caven & Aghevli LLC

(57) ABSTRACT

A technique for performing barrier synchronization among a plurality of program threads. More particularly, at least one embodiment of the invention keeps track of completed tasks associated with a number of program threads using bits within a barrier register that can be updated and reassigned without incurring the amount of bus traffic as in the prior art.

29 Claims, 6 Drawing Sheets

METHOD AND APPARATUS FOR COMMUNICATION BETWEEN TWO OR MORE PROCESSING ELEMENTS

FIELD

Embodiments of the invention relate to microprocessors and microprocessor systems. More particularly, embodiments relate to a communications mechanism between two or more processing elements within a computer system. At least one embodiment of the invention relate to a technique to assign barrier synchronization information among a plurality of processing elements performing portions of a software program.

BACKGROUND

In typical multi-processor computer systems and multi-core processors, software programs may be divided into function-specific tasks, or "threads", and tasks within each thread may be performed by a different processing element. For the purposes of this disclosure, "processing element" may refer to a microprocessor, processor core, processing system, software routine, etc., in which instructions are executed to perform a function or functions associated with the instructions. In one prior art processing configuration, a "master" processing element may execute a multi-threaded software program and assign tasks within each thread to other processing elements ("slaves"). In such a "master-slave" multi-processing system, the master must detect when each of the slaves have completed their respective tasks before assigning another group of tasks to the slaves. A technique for communicating information between the master and slave processing elements to indicate the beginning and/or end of a set of tasks to be performed by the slaves concurrently is often referred to as "barrier synchronization".

In general, access to registers between processing elements, such as two microprocessors, within a computer system typically requires intermediate steps, such as storing data within in memory before storing the data to a particular register within a processor. Moreover, typical prior art communication between two processing elements may require that the processing elements communicate according to a specific protocol commensurate with the type of computer system they are a part of. These prior art techniques of communicating between processing elements can require extra processing cycles, which may degrade processor and system performance. For example, in a point-to-point interconnect computer system with shared memory protocols, barrier synchronization using a single shared memory location between N processors can result in as many as 2N cache line transfers, which can translate into $2N^2$ bus transactions FIG. 1 illustrates a processing system (microprocessor or computer system) in which a prior art barrier synchronization technique is used. Particularly, in FIG. 1, the master processing element is executing a program having two threads and assigns a task within each thread to a respective slave processing element. In order for the master to perform barrier synchronization, it must first initialize a counter value stored in either the master, a slave, or some other memory structure, to a known value.

The master must then indicate to each slave that the barrier synchronization counter has been initialized and each slave must acknowledge in response. In some prior art examples, the barrier synchronization counter is stored in a cache line in one of the slaves or the master. In such an example, cache coherency protocols must be used to grant ownership of the cache line to the master and the slaves must use cache coherency protocols to modify the count to indicate when they each have completed their assigned task. When the count indicates that all slaves have completed their tasks, the master may then assign a new task to each of the slaves corresponding to the threads of the multi-threaded program.

The barrier synchronization technique used in the processing system of FIG. 1 requires numerous bus transactions between the slaves and the master due to the caching protocol used to initialize and update the barrier synchronization counter value. The traffic on the bus grows linearly in the example of FIG. 1 as the master processing element performs programs with a greater number of threads and more slave processing elements are added to perform tasks within each thread. Therefore, the prior art barrier synchronization technique used in conjunction with FIG. 1 can scale poorly with the number of threads executed in a multi-threaded program, as the additional inter-processing element bus traffic can have adverse effects on computing system performance.

FIG. 2 illustrates another processing system in which a prior art barrier synchronization technique may be performed. In particular, FIG. 2 illustrates a multi-processing element ("PE#") system, in which a barrier synchronization count is stored in a barrier synchronization circuit. Each PE is logically connected ("hard wired") to the barrier synchronization circuit which keeps track of the count by associating a bit or bits with each PE via a fabric of logic gates (e.g., "AND" gates) through which the PE's can update their associated bit or bits after completing the concurrent tasked assigned to them. Once every PE has updated its associated bit or bits, the next task can be assigned to the PE's concurrently.

One problem with the technique illustrated in FIG. 2 is that the bit or bits associated with each of the PE's is statically assigned and cannot be changed or reassigned to another PE, if for example, more processing elements are needed and/or added or some are disabled and/or removed due to a changing number of threads to be processed, and therefore unused hardware is wasted. Indeed, in order for the processing system of FIG. 2 to scale to a greater number PEs, a new barrier synchronization circuit must be used that supports the number of threads to be executed. Furthermore, the processing system of FIG. 2 cannot reassign the bit or bits associated with one PE to another PE, due to the hard-wired circuitry associated with each PE and its respective barrier synchronization counter bit(s).

Therefore, system designers must anticipate a maximum number and configuration of threads that may be performed and design the barrier synchronization circuit accordingly. However if fewer threads are used than the maximum number for which the circuit is designed, the extra circuitry is wasted and unnecessarily increases system cost. Conversely, if more threads are to be supported than what the circuit can support, the circuit must be replaced with one that can support the increased number of threads, thereby incurring additional design costs. Moreover, the system illustrated in FIG. 2 may not combine the processing elements to handle a thread, for example, because the assignment of each PE with a particular barrier synchronization counter bit(s) may not be altered.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Figure 1:
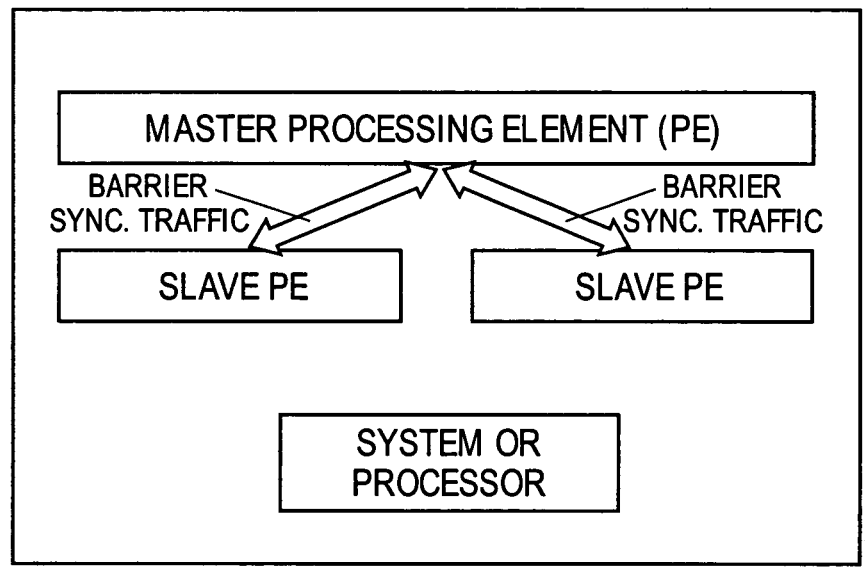
FIG. 1 illustrates a processing system in which a prior art barrier synchronization technique may be used.
Figure 2:
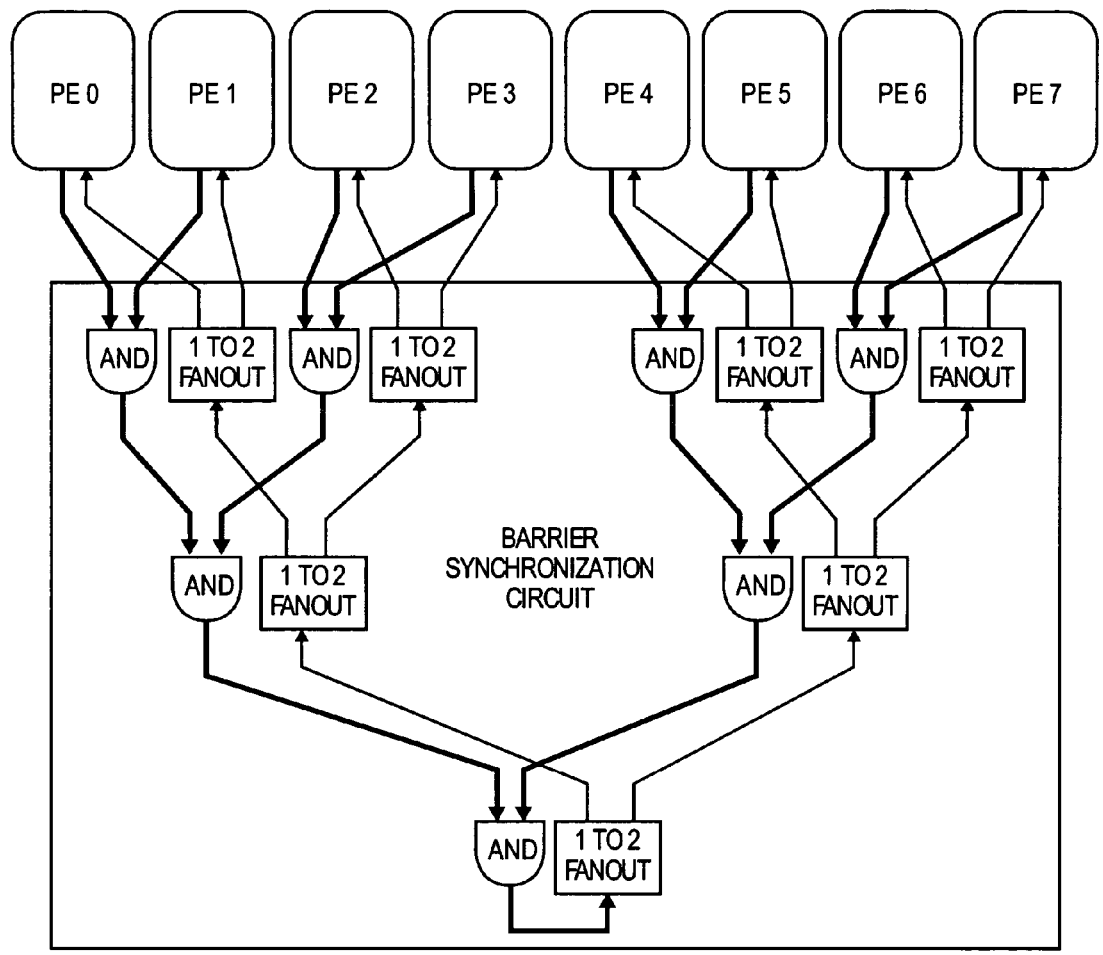
FIG. 2 illustrates a processing system in which a prior art barrier synchronization technique may be used.

Embodiments of the invention relate to microprocessors and computer systems. More particularly, embodiments of the invention relate to a communications mechanism between two or more processing elements within a computer system. More particularly, embodiments of the invention relate to a scaleable barrier synchronization technique that is dynamically configurable and results in less bus or system interconnect traffic than some prior art barrier synchronization techniques. For the purposes of this disclosure, the term "bus" may be used to mean the more generic term, "system interconnect".

Embodiments of the invention help to reduce bus traffic resulting from the communication techniques of the prior art when performing barrier synchronization. For example, unlike the $2N^2$ bus transactions that may result in a prior art barrier synchronization technique using a single shared memory location between a number, "N", of processors within a point-to-point interconnect computer system, at least one embodiment used of the invention used in this configuration requires only 2N bus transactions. Accordingly, at least one embodiment of the invention helps to improve system performance by reducing the number of bus transactions necessary to perform barrier synchronization.

In one embodiment, a storage structure within or associated with a processing element is used to keep track of the barrier synchronization count associated with a number of different threads and processing elements that can be accessed and updated without necessarily using caching bus protocols. Furthermore, in at least one embodiment, the barrier synchronization storage structure may be modified to accommodate variances in threads supported and number or groupings of processing elements to execute the threads.

In one embodiment of the invention, a barrier register (BR) is used within or associated with a processing element to keep track of the barrier synchronization count. For example, in one embodiment the BR is located within a processing element, whereas in other embodiments, the BR is located outside of a processing element with which the BR is associated. In one embodiment, each bit of the BR is associated with a particular processing element to which a task of a thread is to be assigned. After the task has been completed by an assigned processing element, the processing element can update the bit to indicate the completion of the task by using whatever communication protocol supported by the processing element that will result in the least amount of overhead and bus traffic between the PE that hosts the BR and the processing element that is reporting completion of a task. For example, in one embodiment, the BR is within the master processing element, and the slave processing elements indicate a completed task by changing the state of their respective associated BR bit using a software command, electrical signal, or other indicator supported by the communication protocol between the master and slaves processing elements.

In one embodiment of the invention, the BR bits are stored in a register or other memory structure that may be associated with other functions within a processor or computer system, and the number and/or assignment of bits reserved as BR bits may be changed throughout the operation of the computer system or processor, depending on the number of threads and processing element configuration used for a given task. For example, if one task is performed among 2 threads of a program, 2 BR bits may be assigned to two processing elements, respectively. However, if the next task is performed among 3 threads of a program, then 3 BR bits may be assigned to three processing elements, respectively.

Alternatively, one or more processing elements may be used to perform a task of a particular thread by assigning one BR bit to the one or more processing elements. More or fewer processing elements may be assigned to a following task and the BR bit may be reassigned to the more or fewer processing elements, thereby allowing the processing elements to be regrouped throughout the operation of the computer system or processor based on the needs of the multi-threaded program being executed and the processing element resources available.

In general, embodiments of the invention enable a group of reassignable bits within one or more processor registers to be accessed (i.e. read or programmed) by another device or processing element within a computer system "directly", that is without having to first store the data into another memory location before the data may be retrieved from or programmed to a processor register. Embodiments of the invention allow any number of processors to access any number of register bits within another processor without using protocols or mechanisms specific to a particular bus or system interconnect protocol.

At least one embodiment of the invention uses a logic interface that allows other PEs to access bits within the BR. Numerous interface logic configurations may used to allow PEs to access the BR, and embodiments of the invention are not limited to a particular logic interface. For example, in one embodiment, the BR interface logic may contain an array of logical "OR" gates that perform OR functions with signals from the PEs and the BR bit to which each PE corresponds. In this embodiment, a PE's BR bit may be changed based on the result of the OR operation between the currently stored BR bit and the value of the PE's signal. For example, if a BR bit to which a PE corresponds currently stores a "0" value, a signal from the PE having a "1" value would cause the BR bit to change to a "1" value when OR'ed with the PE's signal value of "1".

In other embodiments, the BR interface logic may comprise one or more state machines to interpret commands from a PE and affect a change in the BR bit state to which the PE corresponds. For example, in one embodiment, a PE may issue a "write" or "read" command to a device hosting the BR. Logic within the BR host device may contain BR interface logic, such as a state machine, to interpret the PE "write" and "read" commands and either program a value to the corresponding BR bit or retrieve the BR bit value, respectively. In other embodiments, other BR interface logic examples may be used to allow PEs to directly access BR bits.

In at least one embodiment, the particular communication protocol to be used to initialize and update the BR may change among computer systems or processors in which embodiments of the invention is used. For example, in a shared bus system, such as one that has a front-side bus, master and slave processing elements may communicate according to the front-side-bus protocol, whereas a BR or other register within one of the processing elements may be updated directly without regard to the particular front-side bus protocol. Similarly, in a point-to-point bus system that uses a point-to-point messaging protocols, master and slave processing elements may communicate according to a messaging protocol, whereas a BR or other register within one of the processing elements may be updated directly without regard to the particular point-to-point message protocol. Furthermore, in a multi-core processor, embodiments of the invention may be used in systems that communicate according to a communication protocol, such as dedicated bus signaling, between a master processor core and slave processor cores.

Figure 3:
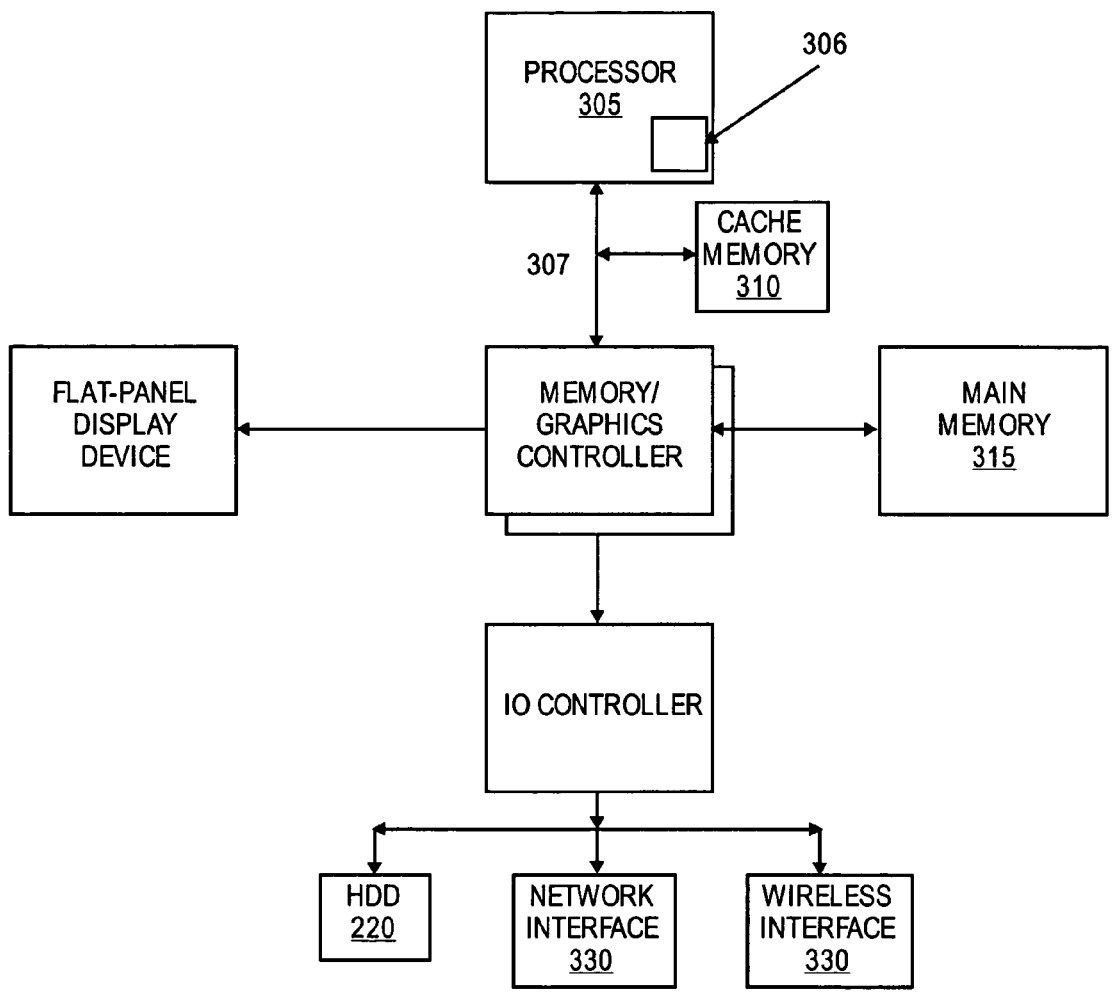
FIG. 3 illustrates a shared bus computer system in which one embodiment of the invention may be used.

FIG. 3 illustrates a front-side-bus (FSB) computer system in which one embodiment of the invention may be used. A processor 305 accesses data from a level one (L1) cache memory 310 and main memory 315. In other embodiments of the invention, the cache memory may be a level two (L2) cache or other memory within a computer system memory hierarchy. Furthermore, in some embodiments, the computer system of FIG. 3 may contain both a L1 cache and an L2 cache.

Illustrated within the processor of FIG. 3 is the BR 306, according to one embodiment of the invention. In other embodiments of the invention, however, the BR may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 320, or a memory source located remotely from the computer system via network interface 330 containing various storage devices and technologies. The cache memory may be located either within the processor or in close proximity to the processor, such as on the processor's local bus 307. Furthermore, the cache memory may contain relatively fast memory cells, such as a six-transistor (6T) cell, or other memory cell of approximately equal or faster access speed.

The computer system of FIG. 3 may be a point-to-point (PtP) network of bus agents, such as microprocessors, that communicate via bus signals dedicated to each agent on the PtP network. Within, or at least associated with, each bus agent may be at least one embodiment of invention 306. Alternatively, an embodiment of the invention may be located or associated with only one of the bus agents of FIG. 3, or in fewer than all of the bus agents of FIG. 3.

Figure 4:
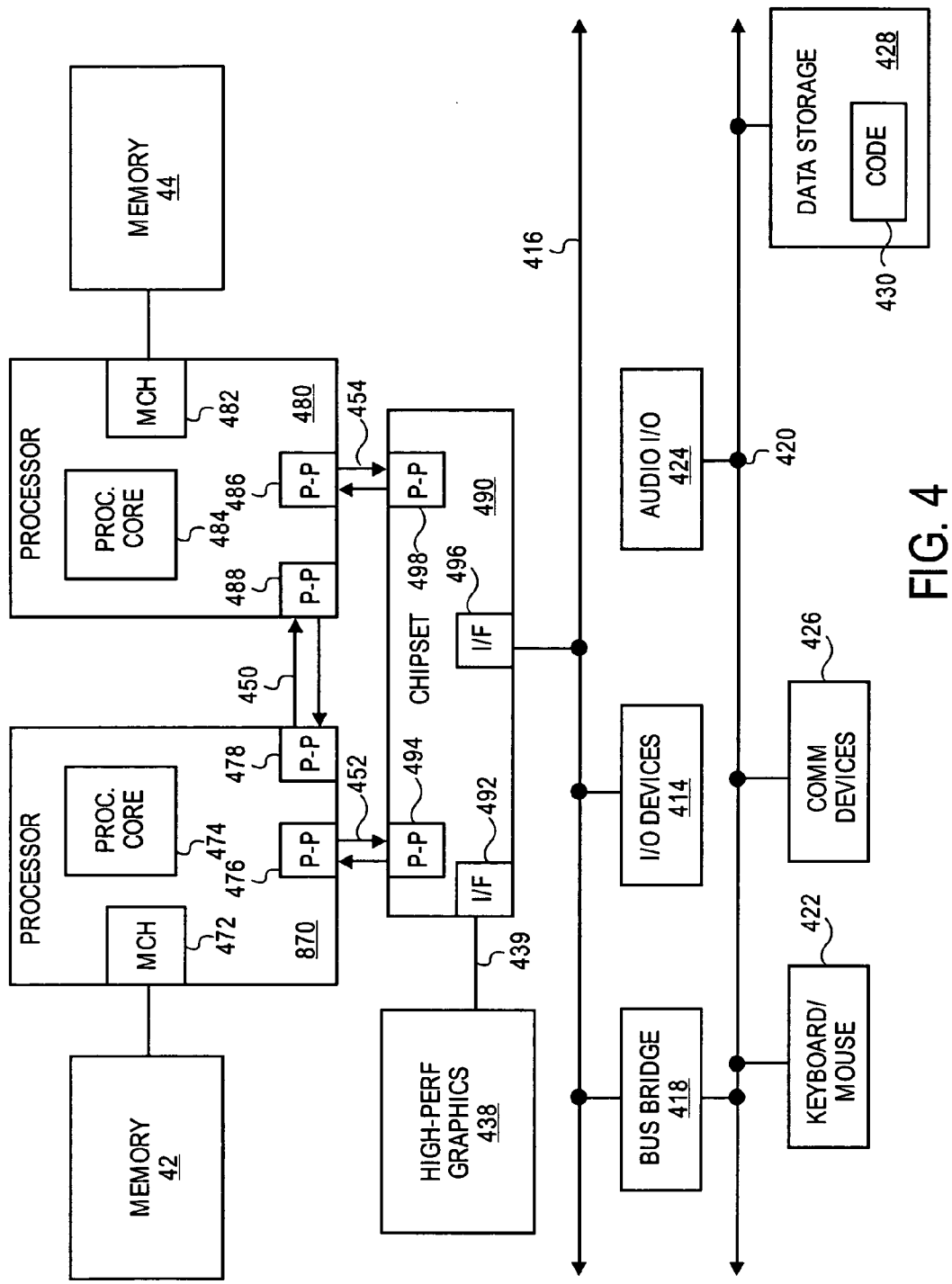
FIG. 4 illustrates a point-to-point computer system in which one embodiment of the invention may be used.

FIG. 4 illustrates a computer system that is arranged in a point-to-point (PtP) configuration. In particular, FIG. 4 shows a system where processors, memory, and input/output devices are interconnected by a number of point-to-point interfaces.

The system of FIG. 4 may also include several processors, of which only two, processors 470, 480 are shown for clarity. Processors 470, 480 may each include a local memory controller hub (MCH) 472, 482 to connect with memory 22, 24. Processors 470, 480 may exchange data via a point-to-point (PtP) interface 450 using PtP interface circuits 478, 488. Processors 470, 480 may each exchange data with a chipset 490 via individual PtP interfaces 452, 454 using point to point interface circuits 476, 494, 486, 498. Chipset 490 may also exchange data with a high-performance graphics circuit 438 via a high-performance graphics interface 439.

In at least one embodiment of the invention, the BR may be located within the PtP interface circuits within each of the PtP bus agents of FIG. 4. Other embodiments of the invention, however, may exist in other circuits, logic units, or devices within the system of FIG. 4. Furthermore, in other embodiments of the invention, the BR may be distributed throughout several circuits, logic units, or devices illustrated in FIG. 4.

Figure 5:
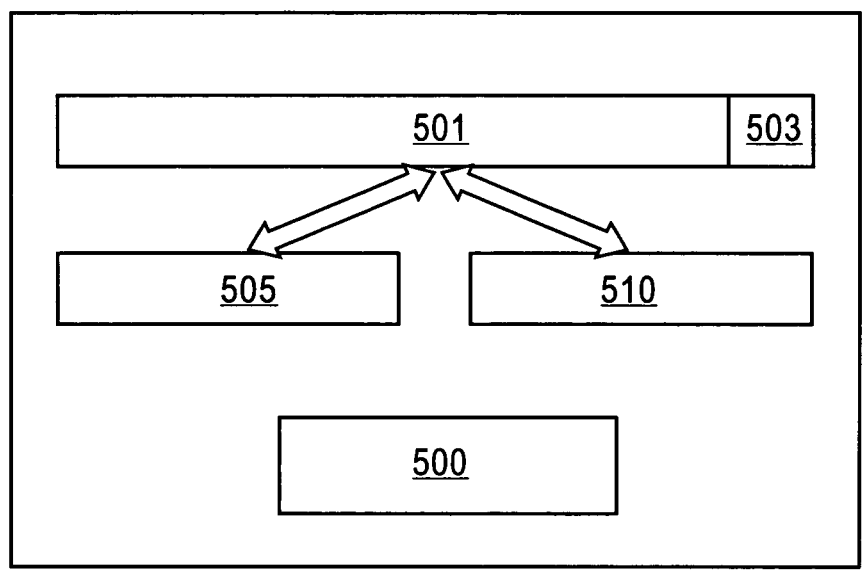
FIG. 5 illustrates a multi-core processor in which one embodiment of the invention may be used.

FIG. 5 illustrates a multi-core processor in which one embodiment of the invention may be used. In particular, FIG. 5 illustrates a master core 501 and two slave cores 505 510 within multi-core processor 500. In one embodiment, the BR 503 is within the master core. However, in other embodiments, the BR may be located in a slave core or within another device outside of the master and slave cores. Furthermore, in one embodiment, interface logic associated with the BR is used to affect changes in the BR bit values as indicated by the PE to which each BR bit corresponds. In one embodiment, the interface logic may include an OR gate array to perform a logical OR operation on signals from the PEs with corresponding BR bit values to change the state of the BR bit values, whereas in other embodiments, other interface logic, such as a state machine to interpret commands, may be used to affect state changes from the PEs to the corresponding BR bit values.

Figure 6:
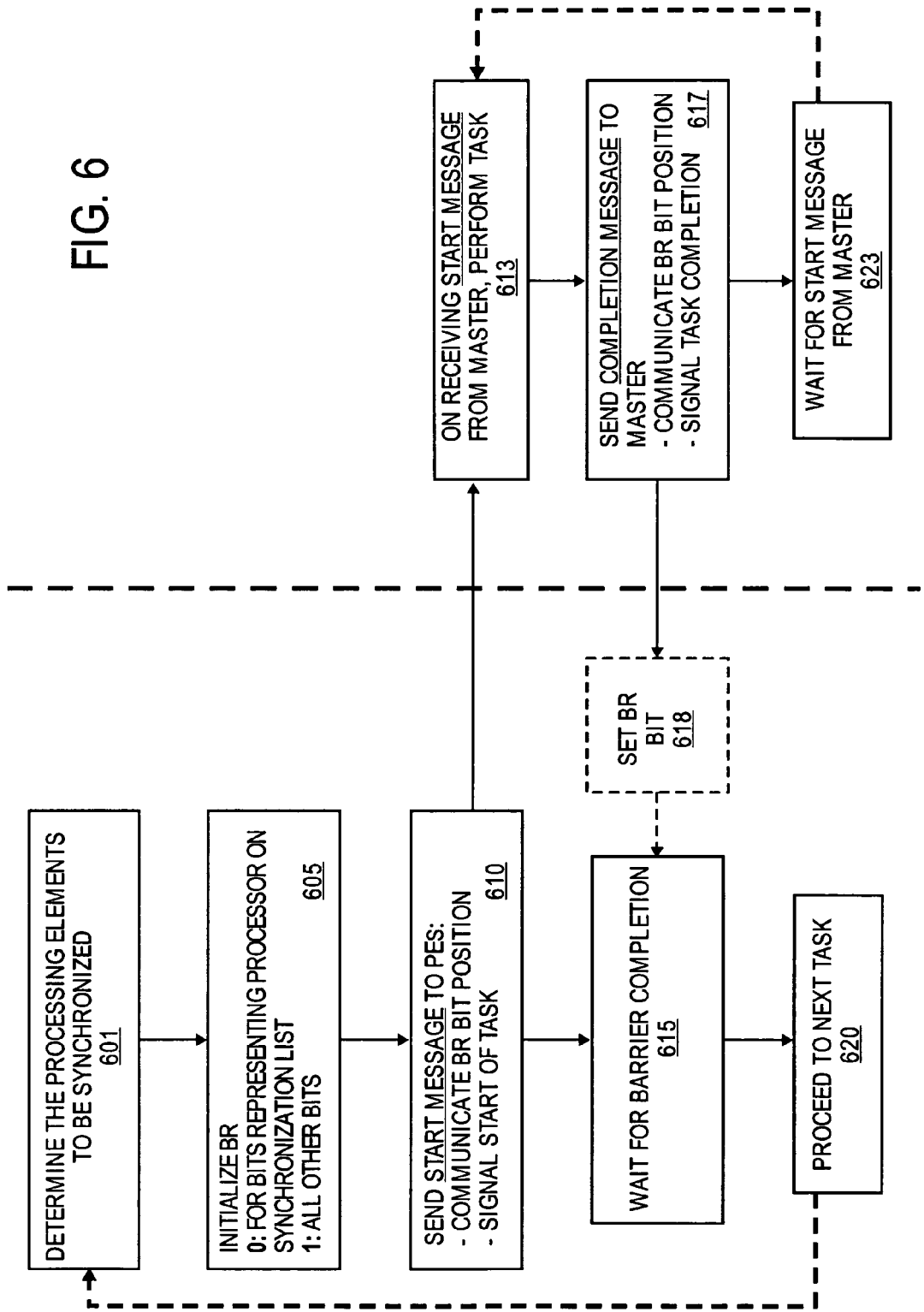
FIG. 6 is a flow diagram illustrating operations associated with at least one embodiment of the invention.

FIG. 6 is a flow diagram illustrating operations that may be used in conjunction with one embodiment of the invention. The left-hand portion of FIG. 6 illustrates operations performed by the master processing element, whereas the right-hand portion of FIG. 6 illustrates operations to be performed by the slave processing element(s).

At operation 601, the master processing element determines the number of processing elements to be assigned tasks associated with a multi-threaded program. In one embodiment, the master determines this by polling the slaves according to a communications protocol, whereas in other embodiments, the slaves update the BR by signaling their presence without the master having to poll them. At operation 605, the BR is initialized by setting a "0" value to bits associated with a particular processing element and a "1" value for all other BR bits. In other embodiments, a "1" may be assigned to BR bits associated with a processing element and a "0" may be assigned to all other BR bits.

A "start" message is sent by the master at operation 610 to all slave processing elements for which a BR bit was assigned to indicate to the slaves the BR bit position to which they correspond and to indicate the start of a task. In one embodiment, the start message may be a command associated with a messaging or other bus protocol. In other embodiments, the start message may be a dedicated signal on a bus. Embodiments of the invention enable system designers to use a start message that results in the least amount of bus traffic between the master and slave processing elements.

At operation 615, the master waits for all tasks concurrently assigned to the slaves to be completed. In one embodiment, the master waits for all assigned BR bits to equal "1" (if the bits were initialized to a "0"), whereas in other embodiments the master waits for all assigned BR bits to equal "0" (if the bits were initialized to a "1"). After all assigned BR bits indicate that the task has been completed by all processing elements to which the task was concurrently assigned, the master assigns the next task to the slave processing elements at operation 620.

After the assigned slaves receive the start message, at operation 613, the processing elements each perform their respective tasks. After each slave is done completing its respective task, a "completion" message is sent to the master at operation 617, which results in the corresponding BR bit being set to a value to indicate the completion of the task at operation 618. In one embodiment, the completion message may be a command associated with a messaging or other bus protocol. In other embodiments, the completion message may be a dedicated signal on a bus. Embodiments of the invention enable system designers to use a completion message that results in the least amount of bus traffic between the master and slave processing elements. After the last slave has indicated a completed task, the slaves wait for the next task to be assigned from the master, at operation 623.

Throughout the examples mentioned herein, a processor register, such as a BR, is updated by another processing element within a computer system. Unlike the prior art, examples described herein allow a register, such as a BR, to be updated in a manner that is independent of the particular bus or interconnect topography or protocol of the computer system. Embodiments of the invention allow a register or registers within one processing element to be accessed by another device or processing element without the having to first store data to be written to or read from the register(s) into an intermediate storage location or memory structure. Furthermore, embodiments of the invention described herein allow each individual bits within the register(s) to be assigned or reassigned to correspond to other tasks or processing elements and accessed directly, that is without having to rely on intermediate storage of the data to be read from or programmed to the register(s).

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An apparatus comprising:
a single register to store a plurality of bits corresponding to any of a plurality of processing elements, any of the plurality of bits in the register to be accessible by any of the plurality of processing elements directly, wherein a start message is to be sent to all of the plurality of processing elements for which a bit has been assigned in the register, wherein the start message is to indicate a position of the bit in the register to which the plurality of the processing elements with an assigned bit correspond and wherein the start message is to indicate to each of the plurality of processing elements, with an assigned bit in the register, to start its respective task, wherein a completion message is to be transmitted in response to completion of one or more of a plurality of tasks and the plurality of processing elements are to update one or more of the plurality of bits based on the position of the bit indicated by the start message and after completing one or more of the plurality of tasks, wherein the plurality of processing elements are to be assigned the plurality of tasks concurrently and cannot be assigned subsequent tasks until the last of the plurality of processing elements have updated the plurality of bits.

2. The apparatus of claim 1 wherein each of the plurality of tasks corresponds to a different thread of a multi-threaded software program.

3. The apparatus of claim 2 wherein the plurality of processing elements comprise a plurality of processing cores within a multi-core processor.

4. The apparatus of claim 2 wherein the plurality of processing elements comprise a plurality microprocessors within a multi-processor computer system.

5. The apparatus of claim 2 wherein the plurality of bits may be increased or reduced in response to the number of processing threads being executed by the plurality of processing elements.

6. The apparatus of claim 1 wherein any of the plurality of bits is to indicate the completion of a plurality of tasks assigned to the any of the plurality of processing elements.

7. The apparatus of claim 1 wherein a completion message, to be transmitted in response to completion of a plurality of tasks, is part of a point-to-point messaging communications protocol.

8. The apparatus of claim 1, wherein an interface to the register is to comprise one or more state machines to interpret a command from at least one processing element of the plurality of processing elements and cause a change to a state of a bit in the register that corresponds to the at least one processing element in accordance with the command.

9. A system comprising:
a register;
a master processing element comprising a plurality of reassignable bits to be stored in a single register;
a plurality of slave processing elements to perform a plurality of tasks assigned by the master processing element, wherein an indication of the completion of the plurality of tasks within the plurality of reassignable bits is to be performed directly by any of the plurality of slave processing elements, wherein a start message is to be sent to all of the plurality of processing elements for which a bit has been assigned in the register, wherein the start message is to indicate a position of the bit in the register to which the plurality of the processing elements with an assigned bit correspond and wherein the start message is to indicate to each of the plurality of slave processing elements, with an assigned bit in the register, to start its respective task, wherein a completion message is to be transmitted in response to completion of one or more of a plurality of tasks and the plurality of processing elements are to update one or more of the plurality of bits based on the position of the bit indicated by the start message and after completing one or more of the plurality of tasks, wherein the plurality of processing elements are to be assigned the plurality of tasks concurrently and cannot be assigned subsequent tasks until the last of the plurality of processing elements have updated the plurality of bits.

10. The system of claim 9 wherein the plurality of slave processing elements are to send a completion message to the master processing element after completing one or more of the plurality of tasks and a completion message is indicated with a signal on a front-side bus.

11. The system of claim 9 wherein the plurality of reassignable bits are initialized by the master processing element to have a first value.

12. The system of claim 11 wherein after all of the plurality of reassignable bits corresponding to the plurality of slave processing agents have been changed to a second value, subsequent tasks are to be assigned to the plurality of slave processing agents.

13. The system of claim 12 wherein the master processing element is to issue a start message to the plurality of slave processing elements to cause the slave elements to begin performing at least one of the plurality of tasks.

14. The system of claim 9 wherein the register is to be associated with the master processing element.

15. The system of claim 9 wherein the register is to be located within one of the plurality of slave processing elements.

16. The system of claim 9 wherein the master processing element and the plurality of slave processing elements each comprise a microprocessor.

17. A method comprising:
assigning a plurality of bits within a single register, coupled to a processor, to a first plurality of processing elements to perform a plurality of concurrent tasks;
directly updating the plurality of bits within the register by any of the first plurality of processing elements upon completion of the plurality of concurrent tasks;
reassigning the plurality of bits in the register to a second plurality of processing elements after the first plurality of processing elements have completed the plurality of concurrent tasks, wherein a start message is to be sent to all of the plurality of processing elements for which a bit has been assigned in the register, wherein the start message is to indicate a position of the bit in the register to which the plurality of the processing elements with an assigned bit correspond and wherein the start message is to indicate to each of the plurality of processing elements, with an assigned bit in the register, to start its respective task, wherein a completion message is to be transmitted in response to completion of one or more of a plurality of tasks and the plurality of processing elements are to update one or more of the plurality of bits based on the position of the bit indicated by the start message and after completing one or more of the plurality of tasks, wherein the plurality of processing elements are to be assigned the plurality of tasks concurrently and cannot be assigned subsequent tasks until the last of the plurality of processing elements have updated the plurality of bits.

18. The method of claim 17 wherein each of the plurality of concurrent tasks corresponds to a different thread within a multi-threaded program.

19. The method of claim 18 wherein the plurality of bits are to count the number of the first plurality of processing elements that have completed their respective task of the plurality of concurrent tasks.

20. The method of claim 19 wherein if the plurality of bits reaches a maximum count, a subsequent plurality of concurrent tasks are to be assigned to at least one of the first plurality of processing elements.

21. The method of claim 20 wherein the first plurality of processing elements are to be grouped into a plurality of groups, each group being assigned one of the plurality of bits.

22. The method of claim 17 wherein the second plurality of processing elements is larger than the first plurality of processing elements.

23. The method of claim 17 wherein the second plurality of processing elements is smaller than the first plurality of processing elements.

24. The method of claim 17 wherein the second plurality of processing elements includes at least one of the first plurality of processing elements.

25. A machine-readable medium having stored thereon at least one instruction, which if executed by a machine causes the machine to perform a method comprising:
assigning a plurality of bits of a register to a plurality threads within a multi-threaded program;
initializing the plurality of bits of the register to a first value;
recording a number of completed tasks of a first set of tasks associated with the plurality of threads;
changing the assignment of the plurality of bits in the register after the first set of tasks are complete if the number of the plurality of threads changes, wherein a start message is to be sent to all of one or more processing elements for which a bit has been assigned in the register, wherein the start message is to indicate a position of the bit in the register to which the one or more processing elements with an assigned bit correspond and wherein any of the plurality of bits is to be accessed directly by any of the plurality of threads and wherein the start message is to indicate to each of the one or more processing elements, with an assigned bit in the register, to start its respective task, wherein a completion message is to be transmitted in response to completion of one or more of a plurality of tasks and the plurality of processing elements are to update one or more of the plurality of bits based on the position of the bit indicated by the start message and after completing one or more of the plurality of tasks, wherein the plurality of processing elements are to be assigned the plurality of tasks concurrently and cannot be assigned subsequent tasks until the last of the plurality of processing elements have updated the plurality of bits.

26. The machine-readable medium of claim 25 wherein the number of completed tasks are recorded by changing the value of the plurality of bits as the task to which the plurality of bits correspond are completed.

27. The machine-readable medium of claim 26 further comprising issuing a start message to cause the first set of tasks to be performed.

28. The machine-readable medium of claim 27 further comprising receiving a complete message after each of the first set of tasks are completed.

29. The machine-readable medium of claim 28 further comprising causing a second set of tasks to be performed after the first set of tasks have completed.

* * * * *

UNITED STATES PATENT AND TRADEMARK OFFICE
CERTIFICATE OF CORRECTION

PATENT NO. : 8,645,959 B2
APPLICATION NO. : 11/095341
DATED : February 4, 2014
INVENTOR(S) : Kushagra Vaid et al.

Page 1 of 1

It is certified that error appears in the above-identified patent and that said Letters Patent is hereby corrected as shown below:

On the title page, in item (73), in column 1, in "Assignee", line 1, delete "Corporaiton," and insert -- Corporation, --, therefor.

In the claims

In column 8, line 2, in claim 4, delete "plurality" and insert -- plurality of --, therefor.

In column 10, line 10-11, in claim 25, delete "plurality threads" and insert -- plurality of threads --, therefor.

Signed and Sealed this
First Day of July, 2014

Michelle K. Lee
*Deputy Director of the United States Patent and Trademark Office*